United States Patent [19]

Booden

[11] Patent Number: 5,782,134
[45] Date of Patent: Jul. 21, 1998

[54] ELECTROMAGNETICALLY ACTUATED THRUST GENERATOR

[76] Inventor: James D. Booden, 25 Cullens Run, Pittsford, N.Y. 14534

[21] Appl. No.: 761,435

[22] Filed: Dec. 6, 1996

Related U.S. Application Data

[63] Continuation-in-part of Ser. No. 355,840, Dec. 14, 1994, abandoned.

[51] Int. Cl.⁶ .................................................. F16H 33/20
[52] U.S. Cl. .................................. 74/84 R; 74/61; 310/81
[58] Field of Search .................... 74/61, 84 R, 84 S; 310/81

[56] References Cited

U.S. PATENT DOCUMENTS

| | | |
|---|---|---|
| 3,584,515 | 6/1971 | Matyas . |
| 3,968,700 | 7/1976 | Cuff . |
| 4,631,971 | 12/1986 | Thomson . |
| 4,712,439 | 12/1987 | North . |
| 4,788,888 | 12/1988 | Fulop . |
| 5,167,163 | 12/1992 | McMahon . |
| 5,473,957 | 12/1995 | Navarro ............ 74/84 R |
| 5,488,877 | 2/1996 | Lieurance ............ 74/84 R |

FOREIGN PATENT DOCUMENTS

| 1547762 | 6/1979 | United Kingdom .......... 74/84 S |

*Primary Examiner*—Charles A. Marmor
*Assistant Examiner*—Troy Grabow
*Attorney, Agent, or Firm*—Cumpston & Shaw

[57] ABSTRACT

A propulsion unit which converts electricity into unidirectional thrust by electromagnetically spinning an assembly of weights about a circuitous path, such that the radius of rotation for a given weight from the center of the spinning assembly is significantly greater along one portion of path than a second portion of the path. Two identical electromagnetically spinning weight assemblies spin in opposite directions to counteract torque stresses created by varying the respect radii of rotation for the weights. The resulting imbalances of centrifugal force produced by the actions of the two electromagnet weight spinning systems produces a unidirectional thrust whose vector would depend upon that sector of the path where the respective radius of rotation is greatest. A plurality of these systems arranged in counter-rotating coplanar pairs along the three axes of three dimensional space (i.e. X, Y, and Z axes) are utilized to produce a smooth unidirectional thrust along any vector.

14 Claims, 3 Drawing Sheets

5,782,134

ELECTROMAGNETICALLY ACTUATED THRUST GENERATOR

The present application is a Continuation in Part application of a prior United States Application having Ser. No. 08/355,840 filed on Dec. 14, 1994 abandoned on May 20, 1997, naming James D. Booden as inventor.

FIELD OF THE INVENTION

The present invention, in general, is related to a class of devices which utilize an imbalance of centrifugal force produced by rotating at least one mass at a varying radius to produce thrust in a given direction. More particularly, the present invention relates to a reactionless thrust generator having a plurality of electromagnetic elements for varying the rotation radius of weights orbiting about a center axis, so as to provide an imbalance of centrifugal force, which produces a controllable and unidirectional thrust.

BACKGROUND OF THE INVENTION

Various devices have been produced using the principle of rotating unbalanced weights about an axis. A number of these devices are shown in U.S. Pat. Nos. 3,584,515 to Matyas, 3,968,700 to Cuff, 4,631,971 to Thornson, 4,712,439 to North, 4,788,882 to Fulop, and 5,167,163 to McMahon. However, previous embodiments have employed mechanical action to produce the unbalanced centrifugal force. Inherent disadvantages of mechanical devices include friction between moving parts, vibration caused by flexing of mechanical components, increased mass of the overall device due to components whose sole function is to support other components, and limits imposed upon the rotational velocities of the rotating mass by the inherent strength (or lack thereof) of the materials used in construction.

Therefore, a need exists for a reactionless thruster that can selectively create a resultant thrust vector which is controllable in both magnitude and direction. The need also exists for a reactionless thrust generator, which is not directly limited by the materials of construction. That is, there is a need for a reactionless thruster that can be constructed from currently available materials, yet exceed the performance of current designs.

SUMMARY OF THE INVENTION

The present invention utilizes a hybrid of electromagnetically operated elements in conjunction with a reduced number of mechanical components to produce an imbalance of centrifugal force. Therefore, this device offers a significant improvement over previous embodiments because there is less loss of thrust production due to the adverse effects of friction and other associated losses inherent to mechanical devices.

In particular, an embodiment of the present invention includes a rotatable housing for rotation about a common axis; a motor connected to the housing for rotating the housing about the common axis; a plurality of masses connected to the housing for rotation about the common axis, each mass moveable between a retracted position defining a first radius from the common axis and an extended position defining a second longer radius from the common axis; an electromagnetic actuator operably connected to each of the masses to selectively dispose the mass between one of the retracted and the extended position; and a bias member operably connected to each of the masses to urge the mass in a direction opposite to the electromagnetic actuator.

In a further embodiment, the electromagnetic actuator includes a coil wound about a frame, and a shaft moveable within the coil. The bias member may include a coil spring disposed between a portion of the shaft and the housing. The electromagnetic actuator moves the mass from the retracted position to the extended position. The electromagnetic actuator moves the mass from the extended position to the retracted position.

DETAILED DESCRIPTION OF PREFERRED EMBODIMENTS

Figure 1:
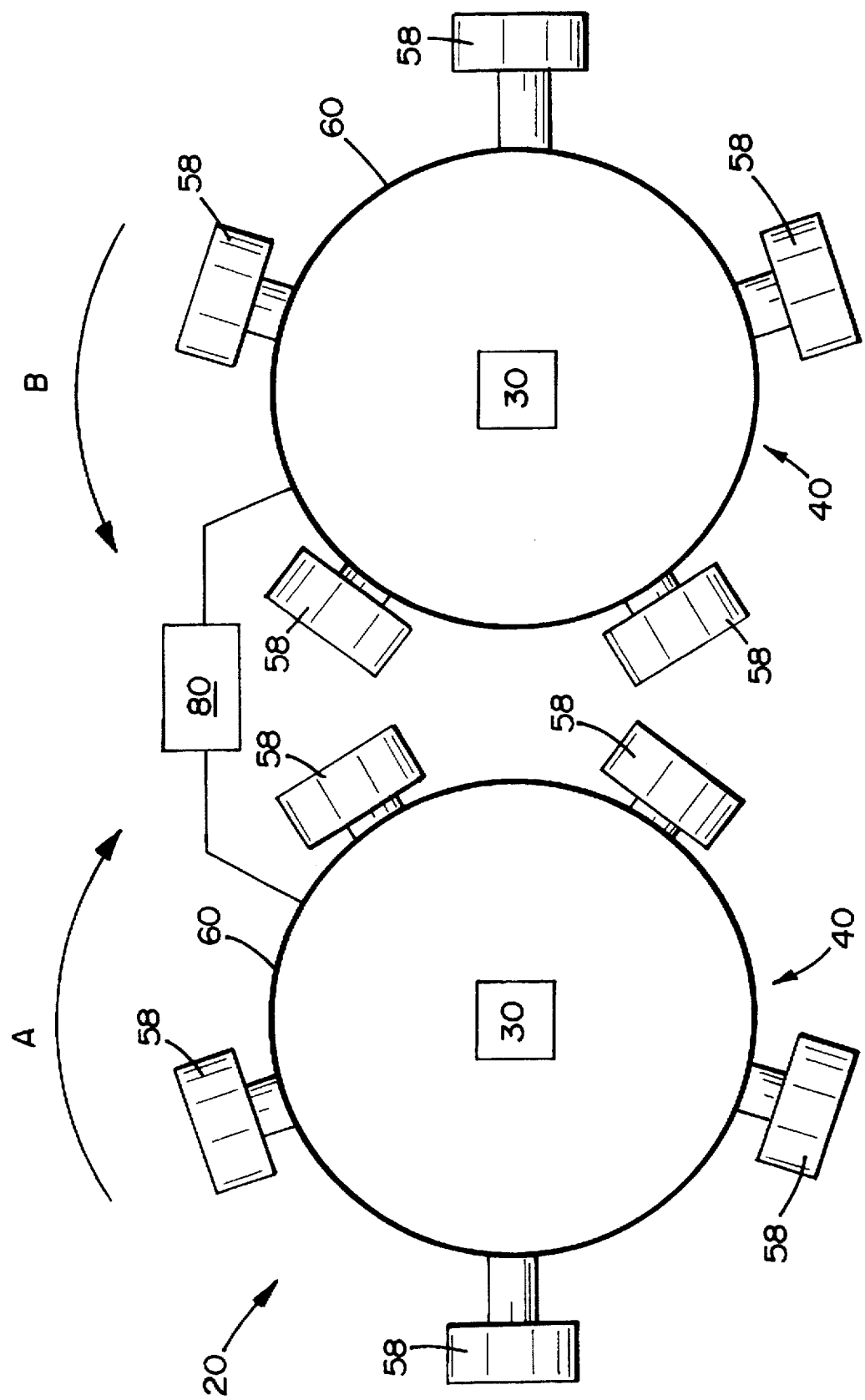
FIG. 1 is a top plan schematic view of a pair of thrust generating units.

The present description sets forth one of a variety of possible configurations of the invention, and is not meant be construed as limiting the configuration of the device. Referring to FIG. 1, the present invention includes assemblies 20. Each assembly 20 includes two counter-rotating primary thrust units 40. The primary thrust units 40, and assemblies 20 may be retained within a common housing 60. Each of the primary thrust units 40 are identical and only a single primary thrust unit is described for the sake of simplicity.

Figure 2:
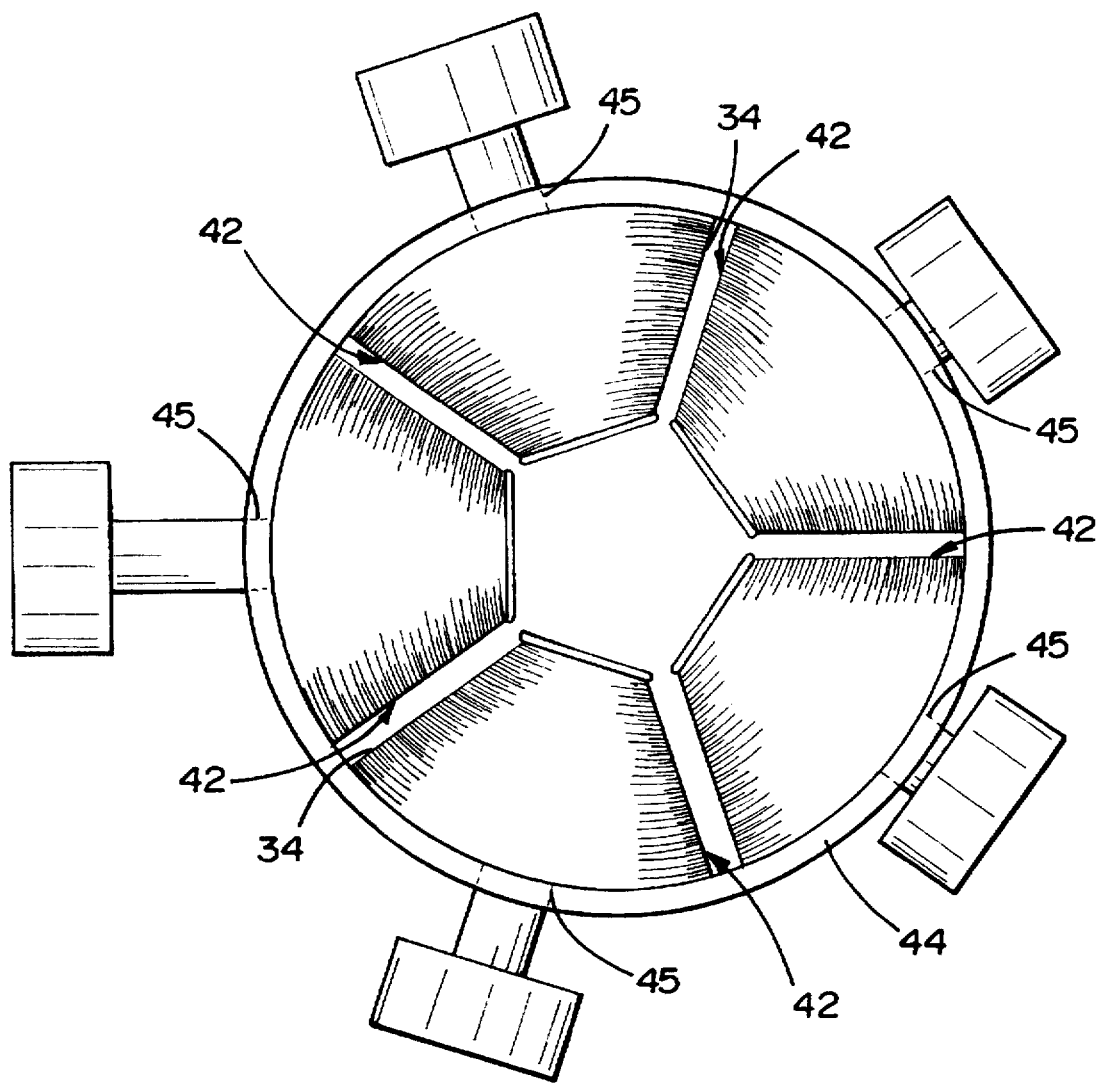
FIG. 2 is a top plan view of a single thrust generating unit.
Figure 3:
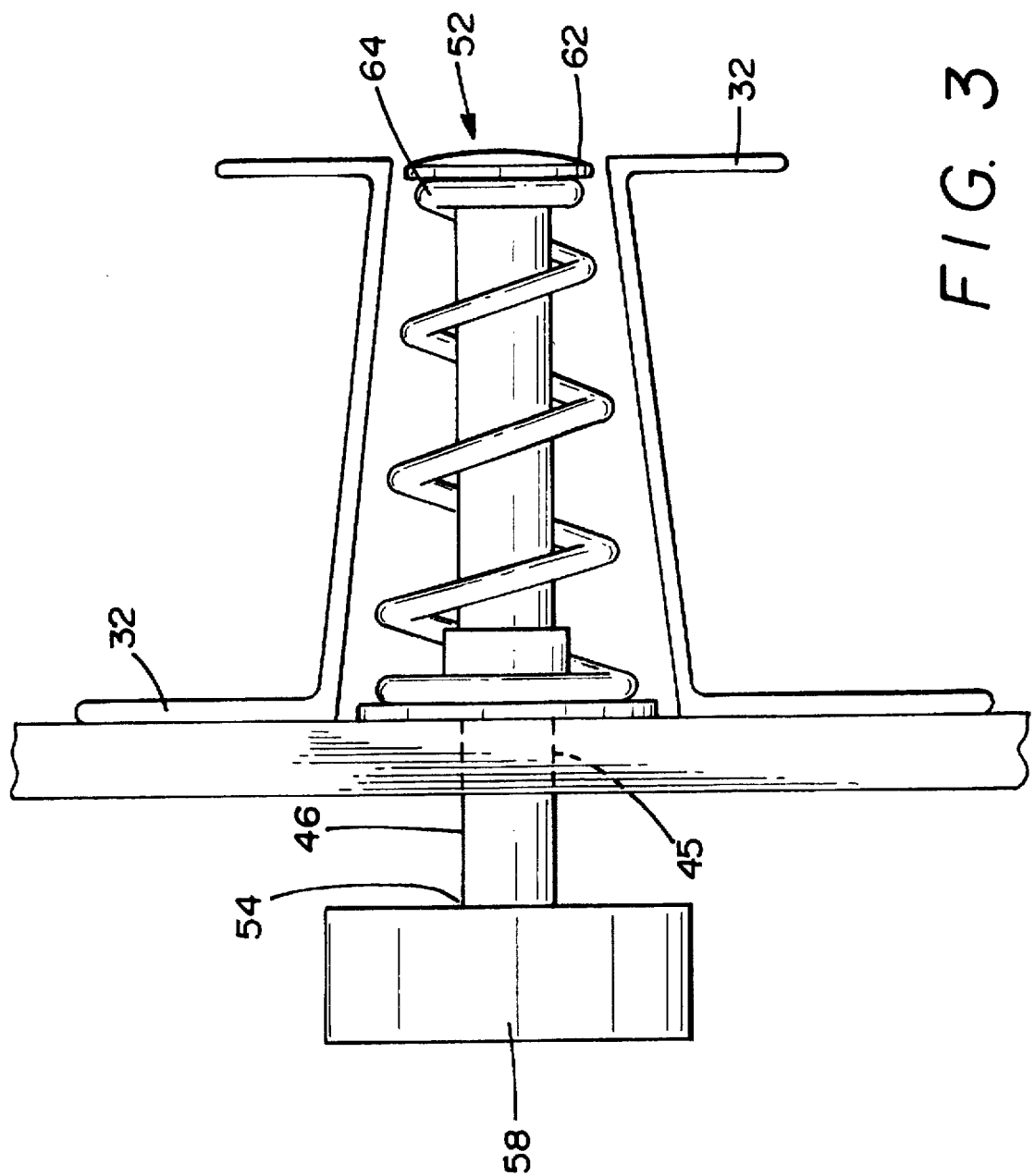
FIG. 3 is an enlarged plan view of a structure for varying the effective radius of a rotating mass.

Referring to FIGS. 2 and 3, a primary thrust unit 40 includes a circular array of electromagnets 42 disposed about a common axis. The electromagnets 42 are attached to a housing 44. The housing 44 is rotatably connected to a motor 30 for rotating the housing and any connected components about the common axis. Each electromagnetic 42 has a core frame 32 and single coil 34 wound about the frame, wherein the longitudinal axis of the frame and coil lies along a radius extending from the common axis. The housing 44 includes a plurality of radial apertures 45. One radial aperture 45 is operatively aligned with a given electromagnet 42. A plurality of shafts 46 are slidably disposed within the apertures 45 and electromagnets 42 for movement along the radius. Each shaft 46 includes an inner end 52 and an outer end 54. Each shaft 46 is positioned in the center of each electromagnet 42 without touching the electromagnet to allow free movement relative to the housing 44 and electromagnet. Such attachment includes bearings or bushings as well known in the industry.

A permanent magnet 58 is connected to the outer end 54 of the shaft 46. The inner end of the shaft 46 includes or is formed with a cap or shoulder 62. A bias mechanism such as coil spring 64 is disposed between the housing 44 and the cap 62. The spring 64 urges the cap 62 towards the center of the housing 44 and common axis. The coil spring 64 inhibits movement of the permanent magnet 58 and shaft 46 radially outward from the center of the circular array. Each electromagnet 42 is operably connected to a controller 80. The controller 80 selectively actuates the respective coil 34 as well as the electric motor 30 which spins the array. The controller 80 may be a solid state electronic device in the fashion of a microprocessor.

The microprocessors of the controller 80 will control the actuation of all of the primary thrust units 40 and is mounted within a conductive shell to shield them from electromagnetic interference as well. The controller 80 can be mounted anywhere on the common housing of the entire unit as dictated by convenience and efficiency. It also contemplated that each of the primary thrust units 40 is enclosed within an electromagnetic shield to prevent them from interfering with each other or any electromagnetic device adjacent to the device.

Operation

In operation, the electromagnets 42 of each primary thrust unit 40 will be spun at a continuous or constant velocity by the electric motor 30. At a given point along the path of rotation, each electromagnet 42 will be energized as it passes that point. Being energized with a given amount of electric current will cause the electromagnet 42 to act, in conjunction with the already existing centripetal force, on the shaft 46 and permanent magnet 58, to push the permanent magnet further out from the common axis. This energized phase of operation will continue as the electromagnet 42 spins through ninety degrees of rotation from the point of activation, at which time the electromagnet will be de-activated. The coil spring 64 will then cause the shaft 46 and permanent magnet 58 to move toward the common axis, thereby reducing the effective radius of the respective magnet 58. To provide for centrifugal imbalance along a common vector it is essential that each electromagnet 42 be sequentially activated as it passes the same point along the path of rotation.

Torsion effects, produced by each primary thrust unit 40 when producing thrust with unbalanced centrifugal force, are significant and must be counteracted if controllable thrust is to be produced. To accomplish this it is necessary to arrange the primary thrust units 40 into pairs, which would rotate their respective electromagnetics 42 in opposite directions and with mirror image velocity vectors. (see FIG. 1 arrows A & B). It is also necessary, for complete counteraction of torsion effects, that the plane of rotation of one of the primary thrust units 40 in a pair is the same as the plane of rotation of the remaining primary thrust unit in the pair. Furthermore, the velocity of both housings 44 and associated electromagnets 42 in a pair of primary thrust units must be equal and in opposite directions at all times so that in operation the two primary thrust units would appear as perfect mirror images of each other at all times. This synchronization serves to reduce stress caused by vibration on the total structure and also maximizes the thrust produced by each primary thrust unit pair. A linkage between the microprocessors controlling each unit in a given pair will facilitate this symmetrical movement.

As has been noted earlier, thrust can be produced in any direction on the common plane shared by all the primary thrust units in a thruster device. To provide complete directional control there are several options open to the user of this thrust devise. The easiest of these is to use a proportional reduction of thrust produced by some of the primary thrust units 40 and cause the entire assembly to rotate toward the area of reduced thrust. That is, a first plurality of masses may be rotatable about the common axis in a first plane. A second plurality of masses, spaced from the first plurality of masses, may be rotatable about the common axis in a second plane. It is contemplated that the first plane and the second plane may be oriented with respect to each other to create a resultant thrust vector in any desired direction. Many other options are available, but these lie within the realm of the utilization of this invention rather than the invention itself and will therefore not be discussed here.

The inventor has calculated values for thrust generation by the present invention. These calculations are based upon actuation of a two pound weight; wherein centripetal force is ma; acceleration=$v^2$/r and velocity=$2\pi(r)$ (rotations per second).

| Extended Radius 4.5" | 90.4 | 125.81 | 164.32 | 207.97 | 256.76 | 310.67 | 369.7 |
|---|---|---|---|---|---|---|---|
| Retracted Radius 4.0" | 82.2 | 112.02 | 146.17 | 185.00 | 228.40 | 276.36 | 328.8 |
| Net Thrust | 8.2 | 13.79 | 18.15 | 22.97 | 28.36 | 34.31 | 40.9 |
| RPM | 600 | 700 | 800 | 900 | 1000 | 1100 | 1200 |
| Extended Radius 5.0" | 102.80 | 139.93 | 182.77 | 231.32 | 285.58 | 345.55 | 411.23 |
| Retracted Radius 4.0" | 82.2 | 112.02 | 146.17 | 185.00 | 228.40 | 276.36 | 328.8 |
| Net Thrust | 20.6 | 27.91 | 36.60 | 46.32 | 57.18 | 69.19 | 82.43 |
| RPM | 600 | 700 | 800 | 900 | 1000 | 1100 | 1200 |

Applicant hereby expressly incorporates by reference copending U.S. patent application Ser. No. 08/355,840 filed Dec. 14, 1994, abandoned on May 20, 1997, in the name of the present applicant.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

I claim:

1. An electric propulsion device, comprising:
    (a) a rotatable housing for rotation about a common axis;
    (b) a plurality of masses connected to the housing for rotation about the common axis, each mass moveable between a retracted position defining a first radius from the common axis and an extended position defining a second longer radius from the common axis;
    (c) an electromagnetic actuator operably connected to each of the masses to selectively dispose the mass between one of the retracted and the extended position, the electromagnetic actuator including a coil wound about a frame and a shaft moveable within the coil; and
    (d) a bias member operably connected to each of the masses to urge the mass in a direction opposite to the electromagnetic actuator.

2. The propulsion device of claim 1, wherein the bias member includes a coil spring disposed between a portion of the shaft and the housing.

3. The propulsion device of claim 1, wherein the electromagnetic actuator moves the mass from the retracted position to the extended position.

4. The propulsion device of claim 1, wherein the electromagnetic actuator moves the mass from the extended position to the retracted position.

5. The propulsion device of claim 1, wherein the plurality of masses are rotatable about the common axis in a first plane and further comprising a second plurality of masses spaced from the first plurality of masses and rotatable about the common axis in the first plane.

6. The propulsion device of claim 1, further comprising a solid state controller for selectively actuating the electromagnetic actuator to create a substantially constant unidirectional thrust.

7. The propulsion device of claim 1, wherein the plurality of masses are rotatable about the common axis in a first plane and a second plurality of masses spaced from the first plurality of masses and rotatable about the common axis in a second plane, the first and the second plane oriented to create a resultant thrust vector.

8. A propulsion device, comprising:

(a) a rotatable housing for rotation about a common axis;

(b) a plurality of masses connected to the housing for rotation about the common axis, each mass limited to movement along a fixed single axis between a retracted position defining a first radius from the common axis and an extended position defining a second longer radius from the common axis;

(c) an electromagnetic actuator operably connected to each of the masses to selectively dispose the mass between one of the retracted and the extended position, the electromagnetic actuator including a coil wound about a frame and a shaft moveable within the coil; and (d) a bias member operably connected to each of the masses to urge the mass in a direction opposite to the electromagnetic actuator.

9. The propulsion device of claim 8, wherein the bias member includes a coil spring disposed between a portion of the shaft and the housing.

10. The propulsion device of claim 8, wherein the electromagnetic actuator moves the mass from the retracted position to the extended position.

11. The propulsion device of claim 8, wherein the electromagnetic actuator moves the mass from the extended position to the retracted position.

12. The propulsion device of claim 8, further comprising a first plurality of masses rotatable about the common axis in a first plane and a second plurality of masses spaced from the first plurality of masses and rotatable about the common axis in the plane.

13. The propulsion device of claim 8, further comprising a solid state controller for selectively actuating the electromagnetic actuator to create a substantially constant unidirectional thrust.

14. The propulsion device of claim 8, further comprising a first plurality of masses rotatable about the common axis in a first plane and a second plurality of masses spaced from the first plurality of masses and rotatable about the common axis in a second plane, the first and the second plane oriented to create a resultant thrust vector along any of three mutually perpendicular axis.

* * * * *